United States Patent [19]
McConnell et al.

[11] 3,766,312
[45] Oct. 16, 1973

[54] AERIAL SURVEY
[75] Inventors: Frederick C. McConnell; George Jason; Neil J. Armstrong, all of Calgary, Alberta, Canada
[73] Assignee: Spartan Air Services Limited, Ottawa, Ontario, Canada
[22] Filed: Aug. 11, 1972
[21] Appl. No.: 279,792

Related U.S. Application Data
[60] Division of Ser. No. 65,259, Aug. 19, 1970, Pat. No. 3,709,607, which is a continuation of Ser. No. 817,448, April 18, 1969, abandoned.

[52] U.S. Cl. ............... 178/6.8, 356/4, 356/152, 250/203 R, 244/17.11
[51] Int. Cl. ............................................. G01b 11/26
[58] Field of Search ................ 356/4, 5, 141, 152, 356/172, 138; 250/203 R, 215; 244/17.11, 17.17; 33/1 T; 178/6.8

[56] References Cited
UNITED STATES PATENTS
| 3,603,688 | 9/1971 | Smith-Vaniz | 356/152 |
| 3,523,660 | 8/1970 | Atteberry et al. | 244/17.11 |
| 3,370,293 | 2/1968 | Green | 250/203 R |
| 3,439,170 | 4/1969 | Zagone et al. | 356/152 |
| 3,426,146 | 2/1969 | Seaman | 356/152 |
| 2,817,994 | 12/1957 | Ehrenhaft et al. | 356/150 |

FOREIGN PATENTS OR APPLICATIONS
| 854,266 | 11/1952 | Germany | 33/1 T |

OTHER PUBLICATIONS
Geodolite 3A, Spectra–Physics, Inc., Brochure, 3–1968.

Primary Examiner—Samuel Feinberg
Assistant Examiner—S. C. Buczinski
Attorney—Harvey Kaye

[57] ABSTRACT

A target positioning device has a closed circuit television system on a helicopter, the system having a camera arranged to view the terrain below the helicopter and a viewing console for displaying an image of the terrain to the pilot. A laser and a laser detector of which one is on the ground and the other on the helicopter, are used to indicate to the pilot whether the helicopter is accurately vertically aligned with a predetermined point on the terrain.

17 Claims, 3 Drawing Figures

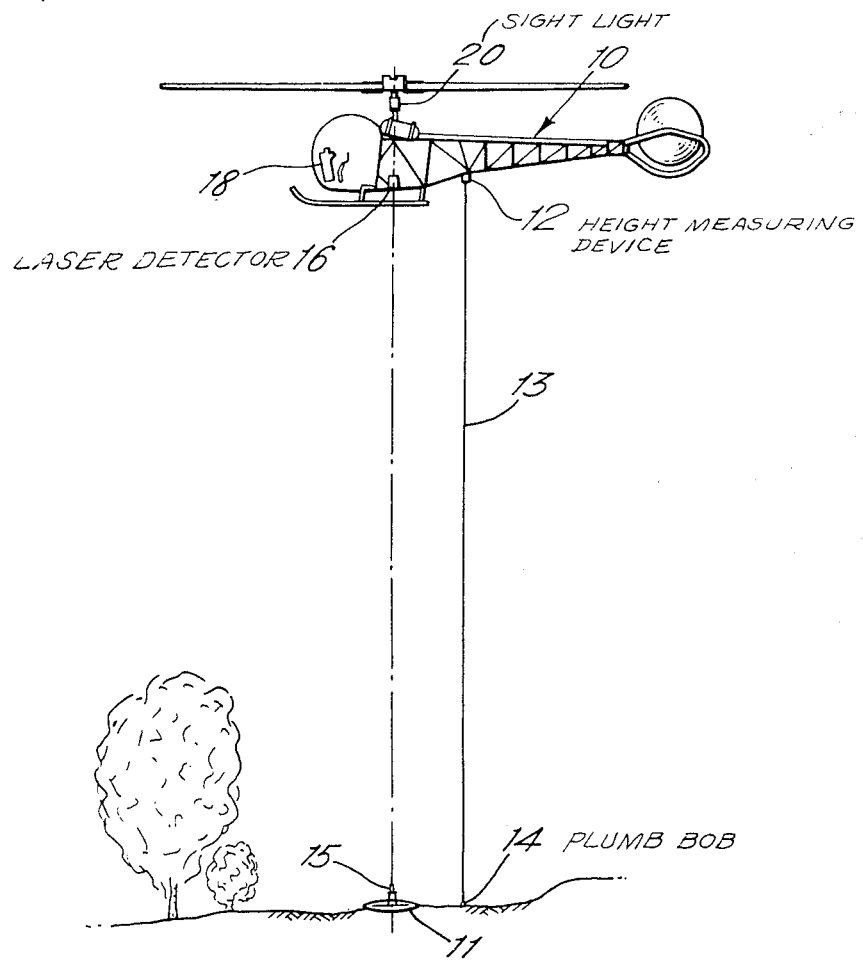

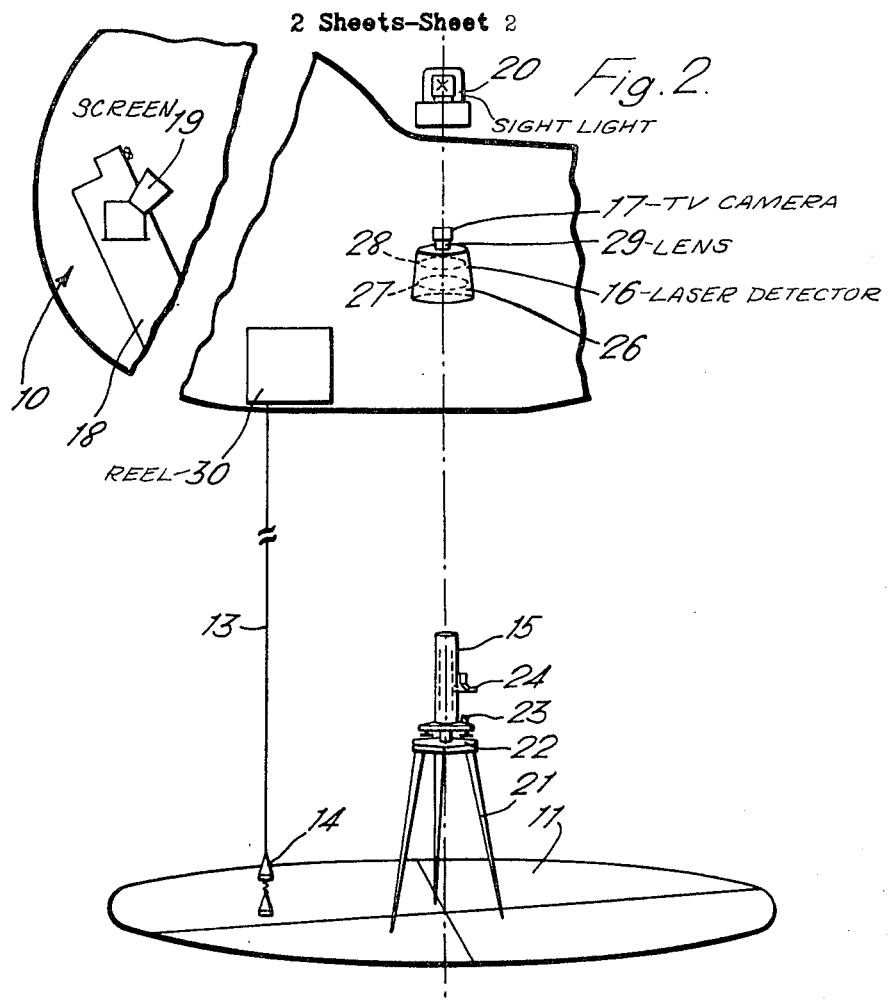
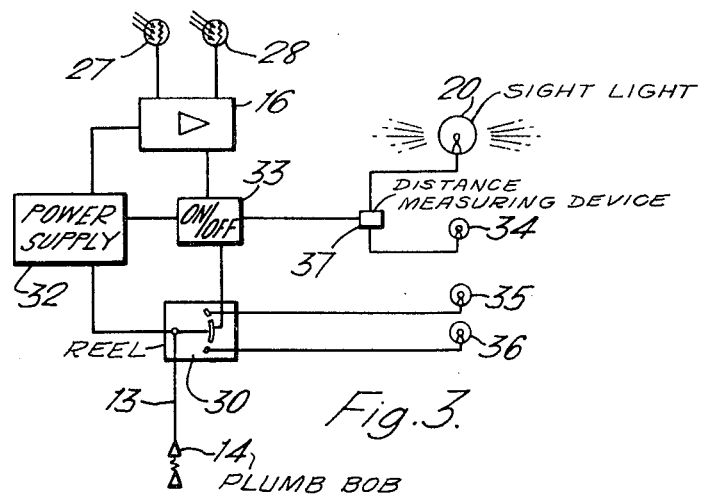

AERIAL SURVEY

CROSS REFERENCE TO RELATED APPLICATION

This application is a divisional of application Ser. No. 65,259, filed Aug. 19th, 1970, now U.S. Pat. No. 3,709,607 which itself is a continuation of Ser. No. 817,448, filed Apr. 18th, 1969, and now abandoned.

This invention relates to target positioning apparatus for use in aerial surveying.

Surveying has for many years been one of the most important aspects of mining, petroleum or other field operation, and it is a time-consuming procedure. All surveys rest primarily on linear measurements for the direct determination of distances. In non-wooded, accessible areas, surveying has historically been carried out by surveyors using transits and stadia poles. Often the system of surveying known as triangulation (which utilizes the simple geometrical principle that if one side and two angles of a triangle are known, the measurements of the rest of the triangle can be computed) is used. Thus, linear measurements may be supplemented by angular measurements. This enables distances to be determined over areas which cannot be measured directly, as, for example, hilly or broken ground.

In wooded areas and in relatively inaccessible areas, both distance and angle measuring devices (transits and theodolites) placed at ground level cannot be used. Accordingly, it has been the practice to build a tower on top of which sits a slave or master station, thus giving a line of sight above the treetops for twenty to thirty miles distance. A portable steel observation tower, as for example that known under the trade name Bilby Tower, has frequently been used. Such an observation tower is like a giant tripod, extensible to over 100 feet, and is provided with an inner tripod which holds the transit or theodolite, but does not vibrate at the movements of the surveyors who stand on the separate outer tower. The task of building or erecting such towers in remote areas has been facilitated in recent years by the use of helicopters, which can transport both the men and the materials.

However, the building or erecting of such towers is an expensive and time-consuming task. Consequently it has been suggested that the helicopter could be used as a sighting target, if it could hover accurately over a point on the terrain. The practical success of such a proposal depends upon: firstly, the provision of accurate means of measuring the distance from a fixed point (in line of sight with and distant from the helicopter) to the helicopter; secondly, the provision of sufficient hovering accuracy for the helicopter; and thirdly, the provision of a satisfactory hover sight.

The first problem has been solved by use of a tellurometer, which is a distance measuring device utilizing line-of-sight radio waves. It is, in effect, a two-way radio telephone system which operates between a master unit and a remote unit. The second problem has been solved by provision, in the helicopter, of a stability augmentation system which allows for a more accurate hovering technique.

It has been suggested to solve the third problem and also to provide an accurate surveying system and technique that the following procedure be utilized. A helicopter is fitted with a vertical rod (like a stadia pole) located at the centre of the top of the helicopter. Also installed in the helicopter and precisely located in the centre bottom of the machine is a plumb bob on a string, attached to a drum mechanism, for measuring the distance of the helicopter above the ground. By looking through a series of mirrors located in the pilot's compartment of the helicopter, the pilot can see the string and plumb bob and a station mark below him. The pilot can raise or lower the helicopter to accommodate the height of the trees. He can also manoeuvre until the extended plumb bob is located exactly over the station mark. He can then attempt to hold the helicopter in this fixed position while another member of the survey crew, using a tellurometer, takes a reading on the vertical pole attached to the top of the helicopter. The helicopter may also have attached to the top thereof a Grimes beacon or a strobe light, in order that the general direction could be determined by the tellurometer operator in the distance. The height of the helicopter is measured by calibrating the plumb bob string. The pilot and the tellurometer operator are in radio contact so that the pilot can inform the operator when the plumb bob is precisely over the station mark in a position for a reading to be taken.

While this system and procedure has proven fairly accurate, it is quite expensive. Furthermore, the accuracy is impaired by the fact that wind and turbulence created by the helicopter may have an effect on the stability of the plumb bob line. Consequently, the stadia pole atop the helicopter may not be along a line exactly vertical to the station mark.

It has also been proposed to provide a television camera on a helicopter, the television camera being mounted in a pendulum-like manner so that the optical axis of the camera will always assume a vertical position. A monitoring television receiver in the helicopter enables the pilot to cause the helicopter to hover in a position above a given point on the ground. The camera may include a zoom lens and appropriate filters to overcome the effects of inclement weather. However, this arrangement has the disadvantage that the pilot has to adjust the zoom lens in addition to his normal piloting functions as he approaches a position above the point on the ground, and to readjust the zoom lens if he inadvertantly manoeuvers into a position in which the point is no longer in the field of view of the camera, which adds considerably to the tasks which the pilot has to perform, particularly when this operation is carried out under conditions of poor visibility.

It is accordingly an object of the present invention to provide a novel and improved target positioning apparatus for use in aerial surveying which mitigates the above disadvantages.

It is a further object of the present invention to provide a target positioning apparatus for use in aerial surveying which employs a television system to assist a helicopter pilot to locate a point on the ground and a laser beam to enable him to position the helicopter more accurately above that point.

According to the present invention, a target positioning apparatus employs a television camera and a viewing console mounted on a helicopter and arranged to provide for the pilot a television image of the terrain beneath the helicopter. In addition, a laser and a laser detector are provided, one on the helicopter and the other on the ground so that the pilot can tell when his helicopter is correctly positioned by ascertaining whether the laser is vertically aligned with the laser detector.

It has been found advantageous in some circumstances to utilize a closed-circuit television system in which the camera is mounted in the helicopter by means of well-lubricated gimbal rings such that the camera is free to maintain an attitude substantially vertical to the earth when the helicopter is airborne. Also, the television console with viewing screen is best located adjacent the instrument panel of the helicopter where it can be seen easily by the pilot. In such practice of this invention, the laser may be mounted on the television camera which is kept vertical to the earth; the laser projecting a beam onto the terrain for viewing from the helicopter. Alternatively, as mentioned in the preceding paragraph, the laser can be positioned over the point in such a manner as to project a laser beam vertically upward from the point. A laser beam detector mounted on the helicopter indicates when the helicopter is accurately positioned over the point.

Another feature of the invention is the provision of a control and actuating mechanism responsive to the detection of a laser beam, which mechanism can be utilized to aid in the operation of survey apparatus and in the accurate positioning of the helicopter over the point.

In order to take the desired survey measurements distance measuring equipment normally is associated with the helicopter, for example, horizontal distance measuring equipment such as autotape or tellurometer position fixing devices. Further there is usually a height measuring device also associated with the helicopter which is capable of accurately determining the distance between the hovering helicopter and the point on the ground beneath. This device may be, for example, a calibrated, spring-loaded plumb bob and reel.

If desired, the laser beam detector can be utilized to activate certain preselected mechanisms associated with the helicopter upon detection of the laser beam projected vertically upward. It can be used, for example, to automatically activate the horizontal distance measuring equipment. The detector can comprise plural detection cells, at least one such cell indicating that the helicopter is positioned accurately over the point, and at least another of the cells indicating when the helicopter has drifted such that it is not positioned over the point. The different cells can be used to activate and positively deactivate the distance and height measuring device. The plural cells of the laser beam detector can be arranged in the form of two concentric rings of cells in order to operate as outlined above.

Therefore, the present invention provides a control and actuating mechanism which is particularly suited to use in survey work, although it can find application in other situations wherein a laser beam is utilized and reference is made thereto for actuation and control of other equipment. The mechanism includes a laser beam receiver with first means for sensing a predetermined desired condition and in response to the presence of that condition for initiating operation of a preselected mechanism, and second means for sensing a predetermined undesired condition and in response thereto discontinuing operation of a preselected mechanism. In a preferred embodiment, the control and actuating mechanism utilizes a laser beam detector having plural detection cells. A first cell upon sensing the presence of a desired condition initiates operation of a preselected mechanism. A second cell upon sensing the presence of a predetermined undesirable condition positively discontinues operation of a preselected mechanism.

As an example, if the control and actuating mechanism is mounted in a helicopter for use in survey work, the desired condition can be met when the hovering helicopter is accurately positioned vertically above a point on the terrain, and the undesired condition may be achieved when the helicopter is no longer accurately positioned over that point. Consequently, when the first means in the laser beam receiver, i.e. a first detection cell, senses the laser beam and that therefore the helicopter is accurately positioned over the survey point, the distance measuring devices and the Grimes beacon or strobe light can be activated and their operation commenced. When the second means in the laser beam receiver, i.e. the second detection cell, senses that the helicopter has drifted, i.e. is no longer accurately positioned over the station mark, the operation of the distance measuring devices and the Grimes beacon or strobe light can be terminated.

Another example of the actuation of a preselected mechanism would be the release of the plumb bob reel mechanism when the helicopter is accurately positioned over the survey point, so that the perpendicular distance of the helicopter over the survey point at that time can be measured.

The helicopter preferably is one which is equipped with a stability augmentation system, which aids in a more accurate hovering technique than may be otherwise possible. One such helicopter is known under the trade name Hiller model SL4, and is manufactured by the Hiller Helicopter Company. Another such helicopter is the Bell 47 model 3B—1 helicopter.

The laser can be attached to any normal instrument, and in the present invention, it is a portable laser preferably of the type known as a transit-laser. The inherent characteristics of a laser, namely the emission of an intense beam of coherent light (red in colour in a ruby laser) which is clearly visible either at night or in daylight, are used to advantage. Since the laser beam remains essentially parallel and does not expand as it travels over long distances, the laser beam is analogous to an endless, weightless, stretched string which is visible over a great distance. It becomes, in effect, a clearly visible reference line.

A transit-laser beam is clearly visible on a target one thousand feet away as a spot whose centre can be judged to within about ½ inch. Simple detectors (for example goggles) are available, which by filtering out extraneous light in effect permit greater viewing range. In addition, the operator may use a retroreflector which will pick up the beam at a substantial range allowing the operator to know whether or not he is constantly on target. Should his instrument be jarred for any reason, the retroreflector will make him aware that such has happened. At night, the transit-laser beam is visible for a distance of up to about ten miles. One commercially available laser which may be used in the practice of this invention is known as the University Laboratories Model 610 transit-laser.

The means associated with the helicopter for the taking of distance measurements may be simple or sophisticated. One such simple means is a sight light by which transit readings may be taken from two known locations. Alternatively an autotape or a position-fixing device such as the model MRB3 of Tellurometer Canada Limited may be used; these devices can be adapted to be activated electronically by a laser detector. Upon reception of the laser beam, the laser detector then activates the autotape or the MRB3 which automatically takes distance readings on remote units located at known locations.

The closed-circuit television system which can be used in the various aspects of this invention preferably is one which has high resolution, even under the conditions of vibration and other problems associated with helicopter operation, in order to provide a clear picture. One such commercially available system is manufactured under the brand name of Sony closed circuit television set.

The camera of the closed circuit television system in one embodiment may be mounted pointing down and ahead through the tail boom of the helicopter. The viewing console of the television system normally is placed in front of the rudder pedals of the helicopter and is used by the pilot to enable him to face his instrument panel and still be able to see underneath his machine, thus facilitating his hovering over a fixed point. The closed circuit television system enables the helicopter to hover over a station mark and to obtain a "fix" over such station mark. In another embodiment, the television camera preferably is mounted on well-lubricated and ball-bearinged gimbal rings. Thus, regardless of the attitude of the helicopter, the camera is free to move so that it is perpendicular with the ground at all times when the helicopter is airborne.

In a preferred embodiment of the present invention, a laser beam detector is mounted on the helicopter, a good position being in front of the vertically directed television camera lens. The laser detector may, for example, be a single cell, or preferably may consist of two concentric rows of laser beam sensitive cells. These rows of cells can be used to activate preselected mechanisms mounted on the helicopter upon reception of the beam from the laser mounted over the station mark below.

In a second embodiment of this invention, the laser can be mounted on the helicopter so that the laser beam is centrally located in line with the television set on the helicopter and is always pointing vertically downward. In this way the pilot can see, by means of the closed circuit television set, the positioning of the helicopter by observing the laser beam with respect to the station mark on the ground below.

It is an additional advantage in the practice of this invention that a tape recording of the television operations can be made and preserved. This tape recording could be reviewed later, after the field work is completed, should it be necessary to check the survey results.

The laser beam is used to provide an accurate positioning of the hovering helicopter over a station mark. The accurate measurement of the helicopter height would normally be carried out by using a plumb bob string attached to a calibrated drum. When the plumb bob touches the station mark, the exact height above the station mark can be read.

It is to be observed that reference has been made to a "station mark." Other well-known survey points, such as bench marks, triangulation station marks, traverse station marks and corner monuments, azimuth marks, etc. are also interchangeable with station marks, and indeed, any point whose position it is desired to fix at a given time may be designated as a "station mark."

Reference now will be made to the accompanying drawings which will illustrate the practice of the invention according to one embodiment thereof:

FIG. 1 is a schematic view of a helicopter hovering over a station mark undertaking survey work from the air.

FIG. 2 is a view in more detail of the instrumentation utilized in the survey method shown in FIG. 1; and FIG. 3 is a schematic electrical diagram of the control and actuating mechanism and associated instrumentation, utilized in the practice of this invention in conjunction with the equipment illustrated in FIG. 2.

FIG. 1 shows a hovering helicopter 10 (which may be a Bell 47 model 3B1 helicopter) hovering over a station mark 11, namely a point whose position it is desired to locate. The helicopter is provided with a height measuring device 12, which in the embodiment shown includes a plumb line 13 and a plumb bob 14. Alternatively, although not shown, the helicopter may be provided with a stadia rod incorporated in the bottom thereof which can be read through a telescope on the ground to obtain the measure of the vertical height of the helicopter above the station mark. The helicopter is provided with a laser detector 16 mounted on the left cargo rack. The detector 16 is adapted to receive the laser beam projected by a laser 25 situated over bench mark 11. Directly above the detector 16 is the lens of a television camera 17, the screen 19 of which is mounted adjacent the helicopter instrument panel 18. Directly above the television camera 17 is a sight light 20, which may be a Grimes beacon or a strobelite. This equipment is used to locate the point at station mark 11 in the horizontal plane.

As seen more clearly in FIG. 2, the altitude measuring device 12 includes a plumb bob 14 and reel 30, the reel being calibrated and spring loaded, and provided with a weight sensitive indicator. The spring release in the system records the instant that plumb bob 14 touches the terrain, thus giving the vertical height of the calibrated drum 30 above the station mark 11.

Over station mark 11 is a tripod 21, on the bench 22 of which is mounted a level 23, a vertical telescope 24, and a transit-laser 25. The laser detector 16 includes a dome 26 provided with two internal concentric rows of laser beam sensitive cells 27 and 28, which may be photovoltaic or photoresistance cells. The lens 29 of television camera 17 is in direct vertical line with the laser detector 16. The instrument panel is also provided with indicator lights 31 to be more fully described with reference to FIG. 3.

While not shown in FIG. 2, the rows 27 and 28 of laser beam sensitive cells may be coupled to the sight light and to the electronic distance measuring equipment, e.g. an autotape or position fixing device known as model MRB3 of Tellurometer Canada Limited. The measuring means could be activated when the detector 16 receives the beam of the laser 25; thus automatic distance readings may be taken on two remote units, one located at each of two known locations.

FIG. 3 schematically illustrates the electrical circuit diagram. A power supply 32 is operatively connected to the dome 26 of the laser detector, to an on/off switch 33 and thence to a distance measuring device 37, to the sight light 20, and to the sight light indicator light 34. The power supply is also connected to the motor of the calibrated drum 30, which is in turn connected to two indicator lights 35 and 36 on the instrument panel. The dome 26 of the laser receiver 16 is also connected to on/off switch 33.

In operation, the pilot positions himself utilizing the closed circuit television system. The viewing console with screen 19 is mounted adjacent the instrument panel for easy line-of-vision requiring a minimum of eye movement by the pilot from the RPM indicator. It is preferred that cross-hairs be placed on the console face to assist the pilot in positioning the helicopter 10 over the station mark 11. Two-way radio communication between the pilot and a man on the ground may also be used as an alternative positioning method.

As the helicopter manoeuvres over the survey point the dome 26 receives the laser beam from laser 25, and the beam will first fall on at least one of the outer row of detection cells 27. This will produce no change since the switch 33 will already be in the off position. When the laser beam is detected by one of the inner row of cells 28, indicating that the helicopter is positioned vertically above the beam of laser 25, switch 33 closes and sight light 20, indicator light 34, and distance measuring equipment 37 will be turned on. If the helicopter "drifts" off from the vertical, one of the outer row of detection cells 27 will be triggered opening switch 33 and positively discontinuing operation of equipment 37 and lights 20 and 34. The turning on and off of switch 33 in response to signals generated by the detection cells can be used to initiate and terminate indicator lights, a sight light, and horizontal and vertical distance measuring equipment.

Indicator light 35 may be a green light and indicator light 36 a red light. They are controlled by a tension spring in the line 13, with the green light 35 being on until the plumb bob 14 touches the ground, at which time the green light 35 goes out and the red light 36 comes on. These two lights are in the pilot's line of sight, either on the helicopter instrument panel or on top of the television viewing console. These lights optionally could be eliminated or verified by the use of a two-way radio on the occasions where a man is stationed on the ground by the station mark.

We claim:

1. Target positioning apparatus for use in aerial surveying comprising a helicopter, a closed-circuit television system including a camera and a viewing console both mounted on said helicopter, the camera of said television system being directed to scan the terrain beneath the helicopter when it is airborne and the viewing console of said television system being positioned such that it can be seen by the pilot of the helicopter, and laser alignment means for indicating when said helicopter is positioned vertically over a point whose location it is desired to fix by survey, said laser alignment means including a laser capable of projecting a laser beam directed vertically between said helicopter and said point, and a laser detector for detecting the laser beam, one of said laser and said laser detector being mounted on said helicopter, and means for indicating to the pilot when the laser beam is aligned with said laser detector.

2. Target positioning apparatus as defined in claim 1 wherein said laser is mounted on said helicopter so as to project the laser beam vertically downward onto the terrain such that its position relative to said point can be observed.

3. Target positioning apparatus as defined in claim 1 wherein said laser is positioned over said point in such a manner as to project the laser beam vertically upward from said point, said laser beam detector being mounted on said helicopter.

4. Target positioning apparatus as defined in claim 1 wherein said television camera is mounted on said helicopter such that it can maintain an attitude substantially vertical to the earth when the helicopter is airborne and manoeuvring above said point.

5. Target positioning apparatus as defined in claim 3 wherein said television camera is mounted on said helicopter such that it can maintain an attitude substantially vertical to the earth when the helicopter is airborne and manoeuvring above said point.

6. Target positioning apparatus as defined in claim 2 wherein said television camera is mounted on said helicopter such that it can maintain an attitude substantially vertical to the earth when the helicopter is airborne and manoeuvring above said point and wherein said laser is mounted on said television camera.

7. Target positioning apparatus as defined in claim 3 wherein said television camera is mounted on said helicopter such that it can maintain an attitude substantially vertical to the earth when the helicopter is airborne and manoeuvring above said point, and wherein said laser beam detector is mounted on said television camera.

8. Target positioning apparatus as defined in claim 5 further including a height measuring device associated with said helicopter capable of accurately determining the distance between the hovering helicopter and said point.

9. Target positioning apparatus as defined in claim 5 further including horizontal distance measuring equipment associated with said helicopter.

10. Target positioning apparatus as defined in claim 5 including horizontal distance measuring equipment associated with said helicopter and further including a height measuring device associated with said helicopter capable of accurately determining the distance between the hovering helicopter and said point.

11. Target positioning apparatus as defined in claim 7 wherein said laser beam detector is capable of activating preselected mechanisms associated with said helicopter upon detection of the laser beam projected vertically upward from beneath the helicopter.

12. Target positioning apparatus as defined in claim 7 including horizontal distance measuring equipment associated with said helicopter, and wherein said laser beam detector is adapted to activate said horizontal distance measuring equipment upon detection of the laser beam projected vertically upward from beneath the helicopter.

13. Target positioning apparatus as defined in claim 7 wherein said laser beam detector comprises two detection cells, and wherein means for performing an operating function in response to energisation of either of said detector cells upon detection of the laser beam by said detection cells are connected therewith.

14. Target positioning apparatus as defined in claim 7 wherein said laser beam detector comprises plural detection cells, at least one of said cells being so mounted on said helicopter that upon sensing impingement of said laser beam thereon it is capable of indicating that the helicopter is positioned accurately over said point, at least another of said cells being so mounted on said helicopter that upon sensing impingement of said laser beam thereon it is capable of indicating that the helicopter is not positioned accurately over said point.

15. Target positioning apparatus as defined in claim 7 including horizontal distance measuring equipment associated with said helicopter, and wherein said laser beam detector comprises plural detection cells, a first of said cells being adapted to initiate operation of said horizontal distance measuring equipment in response to impingement of the laser beam on said first cell, and a second one of said cells being adapted to discontinue operation of said horizontal distance measuring equipment in response to impingement of the laser beam on said second cell.

16. Target positioning apparatus as defined in claim 7 including horizontal distance measuring equipment associated with said helicopter, said first cell being adapted to initiate operation of said height measuring device.

17. Target positioning apparatus as defined in claim 7 wherein said laser beam detector comprises two concentric rows of detection cells, the inner row of said detection cells upon impingement of said laser beam thereon being capable of indicating that the helicopter is positioned accurately over said point, the outer row of said detection cells upon impingement of said laser beam thereon being capable of indicating that the helicopter is not positioned accurately over said point.

* * * * *